(12) United States Patent
Gabrielson et al.

(10) Patent No.: US 11,507,408 B1
(45) Date of Patent: Nov. 22, 2022

(54) LOCKED VIRTUAL MACHINES FOR HIGH AVAILABILITY WORKLOADS

(71) Applicant: Amazon Technologies, Inc., Seattle, WA (US)

(72) Inventors: Jacob Adam Gabrielson, Seattle, WA (US); Marcin Piotr Kowalski, Cape Town (ZA); Diwakar Gupta, Seattle, WA (US); Terence Lewis, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 111 days.

(21) Appl. No.: 16/748,309

(22) Filed: Jan. 21, 2020

(51) Int. Cl.
*G06F 9/455* (2018.01)
*H04L 9/32* (2006.01)

(52) U.S. Cl.
CPC ........ *G06F 9/45558* (2013.01); *H04L 9/3247* (2013.01); *G06F 2009/4557* (2013.01); *G06F 2009/45587* (2013.01); *G06F 2009/45595* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 7,925,923 | B1* | 4/2011 | Hyser | G06F 9/4856 714/13 |
| 9,286,100 | B2* | 3/2016 | Salmela | G06F 9/45533 |
| 9,778,952 | B1* | 10/2017 | Sutton | G06F 9/4856 |
| 10,169,069 | B2* | 1/2019 | Jain | G06F 9/45558 |
| 2007/0245348 | A1* | 10/2007 | Araujo | G06F 21/53 718/1 |
| 2010/0023996 | A1* | 1/2010 | Sabin | H04L 9/32 726/1 |
| 2011/0238803 | A1* | 9/2011 | Kern | G06F 9/5077 709/223 |
| 2012/0110574 | A1* | 5/2012 | Kumar | G06F 9/45558 718/1 |
| 2012/0159634 | A1* | 6/2012 | Haikney | G06F 9/4856 726/25 |
| 2013/0097296 | A1* | 4/2013 | Gehrmann | G06F 9/4856 709/223 |
| 2014/0096135 | A1* | 4/2014 | Kundu | G06F 9/455 718/1 |
| 2014/0165063 | A1* | 6/2014 | Shiva | G06F 9/45533 718/1 |
| 2014/0208111 | A1* | 7/2014 | Brandwine | G06F 9/45558 713/171 |

(Continued)

*Primary Examiner* — Mehran Kamran
(74) *Attorney, Agent, or Firm* — Thomas Horstemeyer, LLP

(57) ABSTRACT

Disclosed are various embodiments for a system that hardware locks a virtual machine to a host machine. The host machine can include a processor and a memory. A hypervisor can be stored in the memory that, when executed by the processor, causes the computing device to host one or more virtual machines. In addition, machine readable instructions stored in the memory that, when executed by the processor, cause the computing device to at least: receive a request to perform an operation on a virtual machine hosted by the hypervisor; evaluate the request to determine that the request complies with a policy; and in response to a determination that the request complies with the policy, cause the hypervisor to initiate the operation.

20 Claims, 7 Drawing Sheets

(56) References Cited

U.S. PATENT DOCUMENTS

| | | | |
|---|---|---|---|
| 2015/0220356 A1* | 8/2015 | Khesin | G06F 9/455 |
| | | | 718/1 |
| 2016/0034298 A1* | 2/2016 | Doane | G06F 9/45558 |
| | | | 718/1 |
| 2016/0062785 A1* | 3/2016 | Kumeta | G06F 9/5094 |
| | | | 718/1 |
| 2016/0062853 A1* | 3/2016 | Sugabrahmam | G06F 3/0647 |
| | | | 714/4.11 |
| 2016/0127447 A1* | 5/2016 | Jiang | G06F 3/0486 |
| | | | 709/203 |
| 2016/0378520 A1* | 12/2016 | Dow | G06F 9/45533 |
| | | | 718/1 |
| 2017/0026355 A1* | 1/2017 | Mathaiyan | H04L 9/3271 |
| 2017/0139742 A1* | 5/2017 | Cropper | G06F 9/45558 |
| 2017/0371717 A1* | 12/2017 | Kiess | G06F 9/45558 |
| 2018/0060117 A1* | 3/2018 | Maskalik | G06F 9/45558 |
| 2018/0159826 A1* | 6/2018 | YiSan | H04L 63/0236 |
| 2018/0293093 A1* | 10/2018 | Jain | G06F 9/45533 |
| 2018/0332006 A1* | 11/2018 | Zhao | H04L 63/0263 |
| 2020/0073696 A1* | 3/2020 | Ashok | G06F 9/45558 |
| 2020/0259789 A1* | 8/2020 | Yang | H04L 63/0236 |
| 2020/0379818 A1* | 12/2020 | Kiraly | G06F 9/45558 |
| 2021/0227023 A1* | 7/2021 | Wiggers | G06F 9/5077 |

* cited by examiner

LOCKED VIRTUAL MACHINES FOR HIGH AVAILABILITY WORKLOADS

BACKGROUND

In a typical cloud provider network, multiple virtual machines may be hosted on individual host machines. However, no specific guarantee may be made that a particular virtual machine will be hosted on a specific host machine. For example, a host machine may receive requests to terminate, reboot, or migrate one or more virtual machines. Such requests may be made by the cloud provider itself in order to balance the load across multiple host machines within the cloud provider network, or by individuals attempting to manage usage or resource consumption. As a result, virtual machines may experience accidental interruptions in service or availability. For example, a virtual machine hosting a critical piece of infrastructure may be powered off by a new system administrator ignorant of the virtual machine's role in an organization. As another example, a virtual machine hosting a critical piece of infrastructure may experience temporary downtime related to migration from one host machine to another host machine as part of a load balancing operation.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for locking a specific virtual machine to a particular host machine, where placing the virtual machine in a locked state prevents mutating actions (e.g., migration, pausing, rebooting, termination) that would interrupt the availability of the workload running on the virtual machine. The host machine may receive an indication that the virtual machine is to be locked to the host machine. The host machine may also receive one or more policies that specify which users or entities are allowed to perform specific operations on a locked virtual machine. These policies can be enforced by the host machine itself separately from the control infrastructure of the cloud provider network. As a result, accidental termination, power-cycling, or migration of the virtual machine is prevented unless initiated by an authorized user, machine, or network. Accordingly, the availability of the virtual machine is improved because there are fewer opportunities for the virtual machine to be terminated, power-cycled, or migrated, which could cause an interruption in the service provided by the virtual machine. This can beneficially enable critical workloads, for example emergency call centers and emergency dispatch management services, to run on cloud infrastructure by providing a high degree of assurance that the workload will run uninterrupted. In the following discussion, a general description of the system and its components is provided, followed by a discussion of the operation of the same.

Figure 1:
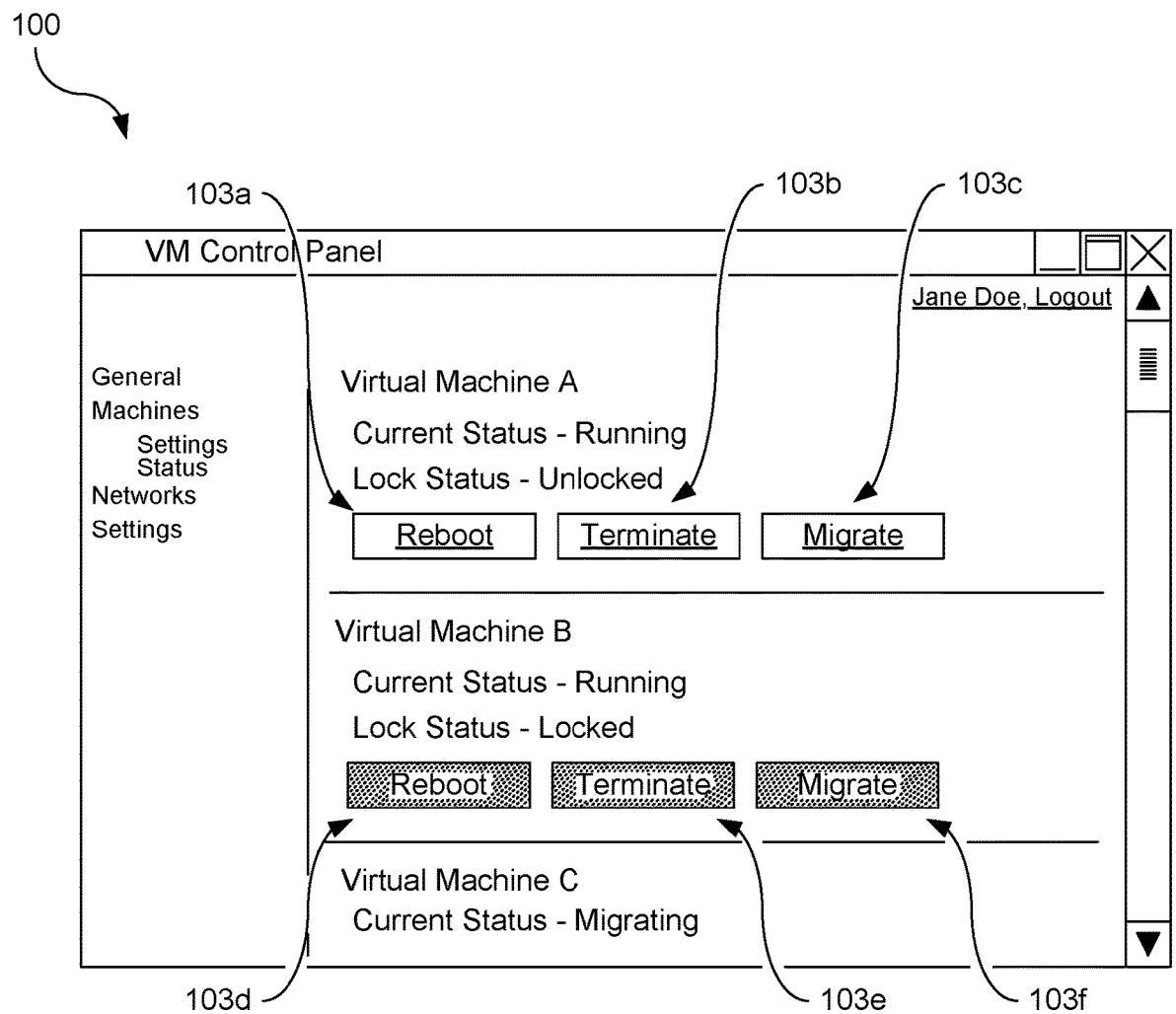
FIG. 1 is a drawing depicting one of several embodiments of the present disclosure.

FIG. 1 sets forth an example of a user interface diagram that shows how a user may experience or interact with the various embodiments of the present disclosure. As shown, a user interface 100 could be presented on a client device. The user interface 100 could take the form of a stand-alone application or could be rendered within or as part of a browser (e.g., as a web-page or other network content). The user interface 100 could provide for various menus or options that allow for a user to configure one or more virtual machines hosted by a cloud provider network. As another example, the user interface 100 could provide information related to the status of individual virtual machines.

The user interface elements 103 could be enabled or disabled based on the state or status of an individual virtual machine. As illustrated, "Virtual Machine A" is in an "unlocked" state or status. Accordingly, user interface elements 103*a*, 103*b*, and 103*c* are enabled to allow a user to reboot, terminate, or migrate "Virtual Machine A." Likewise, "Virtual Machine B" is in a "locked" state or status. Accordingly, user interface elements 103*d*, 103*e*, and 103*f* are greyed out, preventing a user from accidentally or intentionally performing these operations on the virtual machine. Although FIG. 1 presents an example graphical user interface, users can alternatively use a command line interface or other suitable means for sending application programming interface (API) requests or other commands relating to locking and unlocking virtual machines according to the present disclosure. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network.

As discussed later, the status of whether a virtual machine is "locked" or "unlocked" is maintained by the host of the virtual machine. In other words, even if a user may have permission to reboot, terminate, or migrate virtual machines generally, the host machine can be configured to override or ignore these permissions. Instead, policies evaluated by the host machine can govern whether a virtual machine is "locked" and which policy entities are permitted to modify a "locked" virtual machine.

Figure 2:
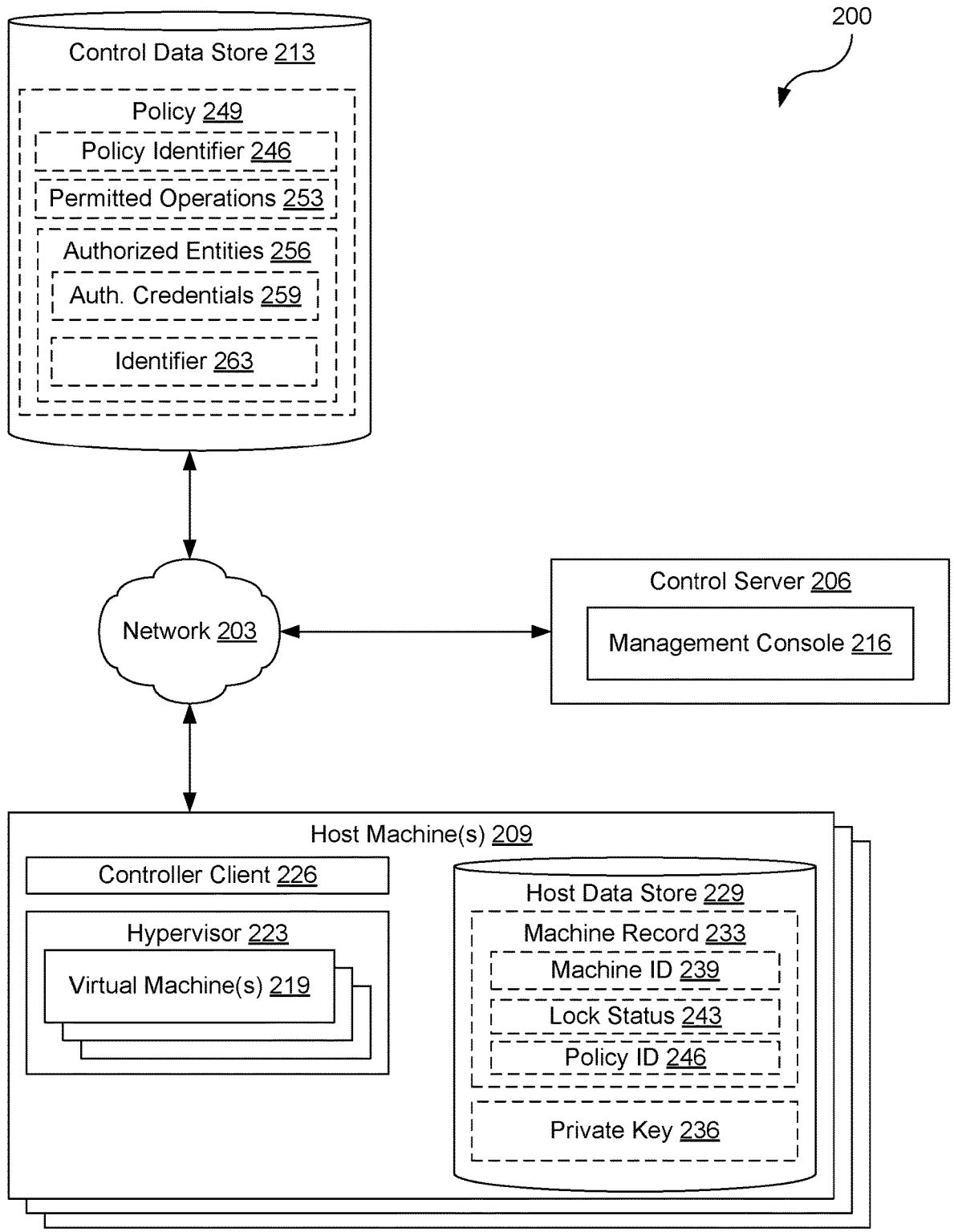
FIG. 2 is a drawing of a cloud provider network according to various embodiments of the present disclosure.

With reference to FIG. 2, shown is a cloud provider network 200 (sometimes referred to simply as a "cloud"). The cloud provider network 200 refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 203 (e.g., the Internet, a cellular communication network) and the hardware and software in cloud provider data centers that provide those services.

A cloud provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes a private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The traffic and operations of the cloud provider network 200 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers 206. Control plane traffic generally includes administrative operations, such as system configuration and management (e.g., resource placement, hardware capacity management, diagnostic monitoring, system state information). The data plane includes customer resources that are implemented on the cloud provider network 200 (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The cloud provider network 200 includes one or more control servers 206, one or more host machines 209, and a control data store 213, which are in data communication with each other via a network 203. The network 203 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 203 can also include a combination of two or more networks 203. Examples of networks 203 can include the Internet, intranets, extranets, virtual private networks (VPNs), and similar networks.

The control server 206 can represent one or more servers that implement or provide control plane operations and over the logical control plane of the cloud provider network 200. To assist in the implementation of control plan operations, the control server 206 may implement a management console 216. The management console 216 can provide an administrative interface for configuring the operation of individual components of the cloud provider network 200, such as configuring one or more virtual machines 219 executing on a host machine 209. As an example, the management console 216 may provide a user interface to allow administrative users to view the status of individual virtual machines 219, modify the status of individual virtual machines 219, configure or reconfigure individual virtual machines 219 or issue commands to individual virtual machines 219 (e.g., pause, suspend, terminate, reboot, migrate, etc.).

One or more host machines 209 may also be present in the cloud provider network 200. Each host machine 209 can provide an operating environment for one or more virtual machines 219. Accordingly, a host machine 209 may have a hypervisor 223 installed to manage and coordinate the execution of any virtual machines 219 hosted by the host machine 209. Each host machine 209 may also execute a controller client 226 for communicating with the control server 206.

The hypervisor 223, which may sometimes be referred to as a virtual machine monitor (VMM), is an application or software stack that allows for creating and running virtual machines 219. Accordingly, a hypervisor 223 can be configured to provide guest operating systems with a virtual operating platform, including virtualized hardware devices or resources, and manage the execution of guest operating systems within a virtual machine execution space provided by the hypervisor 223. In some instances, a hypervisor 223 may be configured to run directly on the hardware of the host machine 209 in order to control and manage the hardware resources of the host machine 209 provided to the virtual machines 219 resident on the host machine 209. In other instances, the hypervisor 223 can be implemented as an application executed by an operating system executed by the host machine 209, in which case the virtual machines 219 may run as a thread, task, or process of the hypervisor 223 or operating system. Examples of different types of hypervisors 223 include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

The controller client 226 can be executed to allow for communications with the control server 206, thereby creating a logical control plane between the host machine 209 and the control server 206. In one example, the controller client 226 can receive commands from the control server 206 to cause the hypervisor 223 to perform one or more commands. Examples of these commands could include commands to cause the hypervisor 223 to instantiate, terminate, or migrate a virtual machine 219. Other commands could include commands to modify the configuration of a virtual machine 219 (e.g., adding or removing storage, adding or removing network interfaces, reconfiguring network interfaces, etc.). The controller client 226 can then evaluate the commands and cause the hypervisor 223 to perform the commands received from the control server 206. For example, the controller client 226 may invoke a function provided in an application programming interface (API) provided by the hypervisor 223 to cause a command received from the control server 206 to be executed. In another example, the controller client 226 could receive commands from the control server 206 for the host machine 209 to perform an operation. The controller client 226 could similarly evaluate the commands and cause the host machine 209 perform the specified operations (e.g., power-off, reboot, disconnect a device, modify a configuration of the host machine 209, etc.). However, the opposite is also possible. For example, the controller client 226 could evaluate the commands to perform a particular operation and ignore, reject, or actively prevent the host machine 209 from performing the operation(s) specified in individual commands.

The controller client 226 can be implemented using several approaches or a combination of approaches. For example, the controller client 226 could be implemented as a network accessible service on the host machine 209 that receives and processes commands. As another example, the controller client 226 could be implemented as a part of the firmware of the host machine 209 (e.g., as a module of the basis input/output system (BIOS) or universal extensible firmware image (UEFI) installed on the host machine 209). In some implementations, the controller client 226 could be implemented as a kernel or user space module that has access to the functions of the BIOS or UEFI of the host machine 209 to implement the functionality provided by the controller client 226. Such low-level access to the host machine 209 may be provided to the controller client 226 to police or regulate the performance of commands by the host machine 209 itself. For example, low-level access to the host machine 209 could be used to modify or control the boot process for the host machine 209, such as requiring a host machine 209 to reboot using a prior image instead of using a network boot sequence.

To prevent accidental or intentional overrides of settings managed by the controller client 226, the controller client 226 may be implemented in hardware. For example, the controller client 226 could be implemented using an add-on card (or "offload card") installed on the host machine 209 or executed in software that runs on one or more of cores of a processor of the "offload card." In some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like. In other instances, the controller client 226 could be implemented in software that is stored in non-volatile memory (e.g., NVRAM) available to the host machine 209 (e.g., as part of the BIOS or UEFI of the host machine 209).

Migration refers to moving virtual machine instances (and/or other resources) between hosts in a computing network. There are different types of migration including live migration and reboot migration. Techniques for various types of migration involve managing the critical phase—the time when the virtual machine instance is unavailable to the customer—which should be kept as short as possible.

During a reboot migration, the customer experiences an outage and an effective power cycle of their virtual machine instance. For example, a control plane service can coordinate a reboot migration workflow that involves tearing down the current domain on the original host (the "source host") and subsequently creating a new domain for the virtual machine instance on the new host (the "target host"). The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

The host machine 209 can also store various data in a host data store 229. The host data store 229 can be representative of one or more locally hosted data stores, such as relational databases, object-oriented databases, hierarchical databases, hash tables or similar key-value data stores, as well as other data storage applications or data structures. The data stored in the host data store 229 can be associated with the operation of the hypervisor 223 or controller client 226. Data stored in the host data store 229 can include one or more virtual machine (VM) records 233, and a private key 236 associated with the host machine 209.

A machine record 233 stores information about a physical or virtual machine. For example, a machine record 233 could store information about a virtual machine 219 hosted by the hypervisor 223 of the host machine 209. This information may be used by the controller client 226 when evaluating whether to cause the hypervisor 223 to initiate a particular action or operation, as discussed later. However, a machine record 233 could also store information about the host machine 209 itself.

Accordingly, a machine record 233 could include information such as a machine identifier 239, a lock status 243, and a policy identifier 246. The machine identifier 239 can represent a unique identifier for a respective machine, such as a virtual machine 219 hosted by the hypervisor 223 or the host machine 209 itself. Examples of machine identifiers 239 can include universally unique identifiers (UUIDs), globally unique identifiers (GUIDs), media access control (MAC) addresses, or sequentially generated identification numbers.

The lock status 243 can indicate whether a particular machine is in a locked state. For example, the lock status 243 could indicate whether a virtual machine 219 identified by the machine identifier 239 is bound or locked to the host machine 209. Similarly, the lock status 243 could indicate whether the configuration of a host machine 209 is generally immutable.

When a virtual machine 219 is locked, one or more restrictions may be placed on the virtual machine 219. For example, the controller client 226 may refuse to honor commands to terminate, reboot, or migrate the locked virtual machine 219. Likewise, the controller client 226 may refuse to honor commands to modify the configuration of a virtual machine 219, such as adding or removing storage or modifying network configurations. In other instances, the controller client 226 may only honor such commands if they are originated or instantiated by an authorized user, machine, or network address. The extent to which the controller client 226 may refuse to honor such commands may be specified by one or more policies 249, which can be identified by a policy identifier 246 that uniquely identifies a policy 249 with respect to other policies 249. Each virtual machine 219 can have one or more applicable policies 249 associated with it, in which case a machine record 233 may include multiple policy identifiers 246.

When a virtual machine 219 is locked, various restrictions may similarly be placed on the host machine 209. For example, the controller client 226 may also refuse to honor commands to power-down or reboot the host machine 209, or may refuse to boot the host machine 209 in a particular manner (e.g., booting from a network instead of from a locally installed operating system image). Likewise, the controller client 226 may refuse to honor commands to modify the configuration of the host machine 209, such as modifying the network configuration, operating system configuration, application settings, or adding or removing devices.

The private key 236 is used to decrypt messages or data received by the controller client 226 on the host machine 209. Such messages or data may be encrypted with a respective public key that is generally known or widely distributed to allow for asymmetric encryption of messages or data intended for the controller client 226. However, in some implementations, access to the respective public key may be more tightly controlled as the ability to encrypt messages or data sent to the controller client 226 may serve as a form of authentication.

Also, various data can be stored in the control data store 213 that is accessible to devices of the cloud provider network 200. The control data store 213 may be representative of a plurality of data stores, which can include relational databases, object-oriented databases, hierarchical databases, hash tables or similar key-value data stores, as well as other data storage applications or data structures. The data stored in the control data store 213 is associated with the operation of the various applications or functional entities described below. This data can include one or more policies 249, and potentially other data.

A policy 249 can represent one or more rules to be enforced by the controller client 226 when determining whether to honor a command received from the control server 206. For example, a policy 249 can specify one or more permitted operations 253 and one or more authorized entities 256. Further, a policy 249 could list or identify one or more authorized entities 256 that are allowed to initiate or cause a permitted operation 253 to be performed.

Permitted operations 253 are those operations which will be performed by the controller client 226 when the controller client 226 receives a request from the control server 206 and when a machine (e.g., the host machine 209 or the virtual machine 219) is in a locked state. By default, a controller client 226 may refuse to honor any requests from the control server 206 with respect to a host machine 209 or a virtual machine 219 unless the request is a request to perform a permitted operation 253. For example, a virtual machine 219 for which high availability is desired might only list a live migration as a permitted operation 253. Accordingly, the controller client 226 might honor a request from a control server 206 to perform a live migration of the virtual machine 219 from the current host machine 209 to a new host machine 209. However, requests to perform other types of migrations or to reboot or terminate the virtual machine 219 would not be honored by the controller client 226 because they are not listed among the permitted operations 253. As another example, it may be desired that a host machine 209 not be rebooted because of the costs associated with a service interruption. Accordingly, the controller client 226 might only permit a reboot of the host machine 209 if the policy 249 specifies that a request to reboot the host machine 209 is received from an authorized entity 256. Similarly, it may be desired that a host machine 209 run a specific version of an operating system for compatibility or support reasons, in which case a permitted operation 253 may be to boot or reboot the host machine 209 from a specific machine image or boot drive (e.g., a locally hosted drive instead of a network boot). Likewise, configuration changes of specific hardware or virtualized hardware resources assigned to a host machine 209 or virtual machine 219 might be excluded from the list of permitted operations 253 to prevent accidental deletion or disconnection of critical storage devices or other hardware resources.

Although the policy 249 has been described as taking a white-list approach, whereby operations are prohibited by default unless specifically listed as allowed, a policy 249 can be implemented using a black-list approach as well, whereby operations are permitted by default unless specifically identified as prohibited. In these alternative implementations, a policy 249 may contain a list of prohibited operations instead of a list of permitted operations 253.

A policy 249 can also include one or more authorized entities 256 as a further restriction on which permitted operations 253 will be performed by the controller client 226. For example, when a policy lists authorized entities 256, the result may be that the controller client 226 will only perform a permitted operation 253 if the request originates from an authorized entity 256. In some implementations, a policy 249 may not list any authorized entities 256. In these implementations, any request to perform an operation listed among the permitted operations 253 would be honored by the controller client 226.

Each authorized entity 256 can include one or more authentication credentials 259 and an entity identifier 263. Authentication credentials 259 can include any data or other mechanism which an authorized entity 256 can use to identify itself to the control server 206 or controller client 226. Examples of authentication credentials 259 can include cryptographic keys or certificates, shared secrets (e.g., tokens, passwords, etc.), and similar approaches. The entity identifier 263 can include any identifier that sufficiently uniquely identifies an authorized entity 256 with respect to other authorized entities 256 or unauthorized entities. Examples entity identifiers 263 can include user names or other user account identifiers, machine names (e.g., a fully-qualified domain name) or other machine identifiers, internet protocol (IP) addresses, network identifiers (e.g., IP netmasks), etc. In some implementations, an authorized entity 256 can have multiple authentication credentials 259 associated with it (e.g., a password and a time-based or HMAC-based one-time password (TOTP or HOTP); a password and a cryptographic certificate or key; etc.). Such multi-factor authentication (MFA) schemes may provide additional security regarding the identity of the authorized entity 256.

Next, a general description of the operation of the various components of the cloud provider network 200 is provided. Although the following general description provides one example of how components of the cloud provider network 200 may interact or operate with each other, the components of the cloud provider network 200 may operate in other manners. Additional details regarding the specific operation of individual components is further provided in the discussion accompanying the subsequent figures.

To begin, a virtual machine 219 may be instantiated on the host machine 209 by the hypervisor 223. For example, an administrative user may configure a new instance of a virtual machine 219 using the management console 216. In response, the control server 206 can select a host machine 209 with sufficient computing resources (e.g., free or unallocated memory, unutilized processor cycles, etc.) to host the virtual machine 219. Accordingly, the control server 206 can send a message to the controller client 226 with information regarding the virtual machine 219 to be instantiated (e.g., amount of memory, number of logical or virtual processors, and amount of storage to be allocated to the virtual machine 219). In response to receiving the instantiation request, the controller client 226 can invoke a function of an API provided by the hypervisor 223 or otherwise provide a message to the hypervisor 223 that causes the hypervisor 223 to allocate the specified resources for the virtual machine 219 and begin execution of the virtual machine 219.

Subsequently, the administrative user can configure the virtual machine 219 to be locked to the host machine 209 using the management console 216. In some implementations, the administrative user can further create a policy 249 that defines how the virtual machine 219 will be locked to the host machine 209 using the management console 216. For example, the administrative user could specify which operations are permitted or prohibited while the virtual machine 219 is executing on the host machine 209. The administrative user could further define which entities (e.g., users or machines) are allowed to initiate a permitted operation 253. As a simple example, a policy 249 could be created that results in a virtual machine 219 being unable to be rebooted, terminated, or migrated from the host machine 209 to another host machine 209. In a more complicated example, rebooting or terminating a virtual machine 219 may be listed as a permitted operation 253, but only when requested by users listed as authorized entities 256 or when the requests are received from a network listed as an authorized entity 256. The policy 249 can then be saved by the management console 216 to the control data store 213. Alternatively, the administrative user could select a preexisting policy 249 using the management console 216 and apply it to the virtual machine 219.

In response, the control server 206 can send a message to the controller client 226. The message can include a machine identifier 239, a policy identifier 246, and an indication that that lock status 243 for the virtual machine 219 should be set to locked. In response, the controller client 226 can update the respective machine record 233 for the virtual machine 219. Subsequent requests to modify the state or configuration of the virtual machine 219 can then be evaluated by the controller client 226 for compliance with one or more policies 249 identified in the machine record 233. If the controller client 226 determines that a subsequent request to modify the state or configuration of the virtual machine 219 fails to comply with any of the policies 249 applicable to the virtual machine 219, then the request can be rejected by the controller client 226. Similarly, if the controller client 226 determines that a subsequent request to modify the state or configuration of the virtual machine 219 violates at least one policy 249, then the request can be rejected by the controller client 226.

As a result, permissions regarding operations that can impact the availability of the virtual machine 219 can be enforced by the host machine 209 itself. This can prevent, for example, a virtual machine 219 where high-availability is important from being accidentally rebooted, terminated, or migrated. For example, the controller client 226 could receive a request from a user who is generally authorized to reboot, terminate, or migrate virtual machines 219 hosted by the cloud provider network 200. However, a previously created policy 249 may not include this user in the list of authorized entities 256. If this user were to attempt to reboot, terminate, or migrate a virtual machine 219 that had been previously locked and was governed by the previously created policy 249, the controller client 226 would reject the request. As a result, execution or operation of the virtual machine 219 would continue uninterrupted.

In a similar example, a host machine 209 may initially be placed in a locked state, as indicated by a respective lock status 243. For example, an administrative user may use the management console 216 to select a host machine 209, change the lock status 243 for the host machine 209, and apply one or more policies 249 to the host machine 209. In response, the controller client 226 can update the lock status 243 stored in the host data store 229. In these examples, the controller client 226 might have access to the kernel of the operating system of the host machine 209, or the BIOS or UEFI firmware of the host machine 209 in order to enforce applicable policies 249. For example, if a policy 249 for a locked host machine 209 indicates that the host machine 209 may not be rebooted except by specific authorized entities 256, then the controller client 226 may have operating system kernel or firmware access to the host machine 209 in order to prevent reboots except by authorized entities 256.

In some implementations, commands sent to the controller client 226 may be encrypted. This may be done not only to obscure the nature of the commands sent to the controller client 226, but also to prevent authorized commands from being intercepted and used as the basis for unauthorized commands. For example, a command packet or payload may include commands to be executed by the hypervisor 223 or the operating system of the host machine 209. They may be encrypted using a respective public key for the private key 236 of the host machine 209. A failure to decrypt the encrypted command packet or payload will generate an unintelligible result, which would be ignored.

The command packet or payload can contain one or more commands that are directly executable by the hypervisor 223 or the operating system of the host machine 209. For example, the command packet or payload could include an executable script. Upon decryption, the controller client 226 could then directly invoke the command packet or payload to cause the host machine 209 or hypervisor 223 to perform the commands. However, in other embodiments, the command packet or payload could include a list of commands and parameters (e.g., functions and respective values or parameters) which could be invoked by the controller client 226 or translated by the controller client 226 into a series of commands executable by the hypervisor 223 or the host machine 209 itself.

Figure 3:
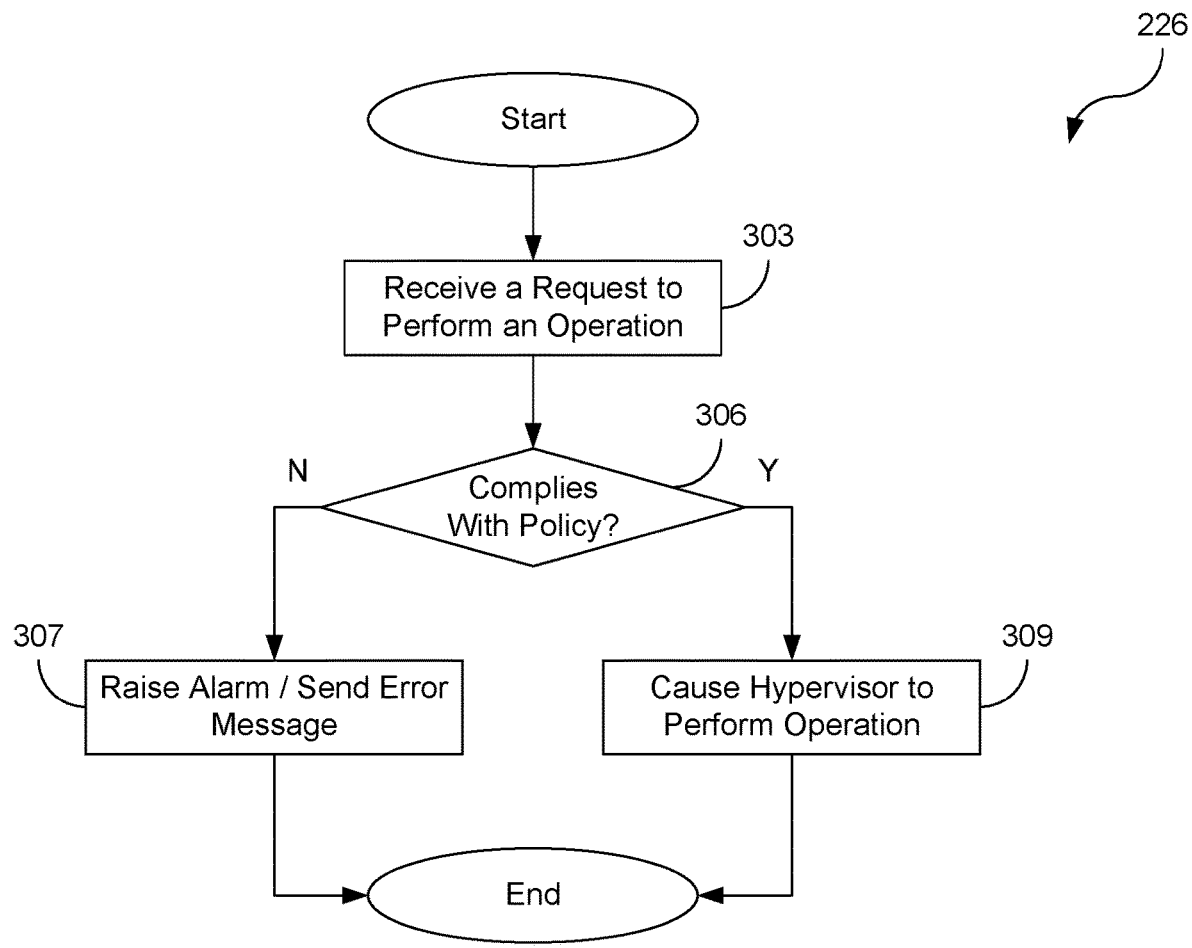
FIG. 3 is a flowchart illustrating one example of functionality implemented as portions of an application executed in a computing environment in the cloud provider network of FIG. 2 according to various embodiments of the present disclosure.

Referring next to FIG. 3, shown is a flowchart that provides one example of the operation of a portion of the controller client 226 according to various embodiments. It is understood that the flowchart of FIG. 3 provides merely an example of the many different types of functional arrangements that may be employed to implement the operation of the portion of the controller client 226 as described herein. As an alternative, the flowchart of FIG. 3 may be viewed as depicting an example of elements of a method implemented in the cloud provider network 200 (FIG. 2) according to one or more embodiments.

Beginning with box 303, the controller client 226 can receive a request to perform an operation on a virtual machine 219 hosted by the hypervisor 223 of the respective host machine of the controller client 226. For example, the request may be to reboot the virtual machine 219. As another example, the request may be to terminate the virtual machine 219. As a third example, the request may be to migrate the virtual machine 219 to another host machine 209. In some instances, the request may be received from a control server 206 in response to an interaction with the management console 216 by an administrative user. In other instances, it may be received from another machine or from another network (e.g., where access to the logical control plane for a customer's virtual machines 219 is granted to a customer's own information technology (IT) infrastructure).

Then at box 306, the controller client 226 can determine whether the request received at box 303 complies with an applicable policy 249. For example, the controller client 226 can parse or otherwise evaluate the request received at box 303 to determine the machine identifier 239 of the virtual machine 219. The controller client 226 could then select a respective machine record 233 in the host data store 229 to identify the lock status of the virtual machine 219. If the lock status 243 indicates that the virtual machine 219 is locked, then the controller client 226 can retrieve one or more policies 249 from the control data store 213 identified by the policy identifiers 246 in the machine record 233. After retrieving the policies 249, the controller client 226 can determine whether the request received at box 303 complies with at least one policy 249. If the request does not comply with any policies 249, then the request received at box 303 is rejected or ignored and the process ends. However, if the request complies with at least one policy 249, then the process continues to box 309. More detailed examples to illustrate how the controller client 226 could evaluate compliance with a policy 249 are provided in the discussion accompanying FIGS. 4-6.

If execution proceeds to box 307, then the controller client 226 can raise an alarm and send an error message to an appropriate logging application or computing device. For example, the controller client 226 could send an alert to a predefined email address or send a message to the management console 216 to render an alert within a user interface 100 that an action that was not permitted by the policy 249 was attempted. The alert or message could specify the identity of the individual(s) who attempted to perform the prohibited action, the type of action that was blocked, and other relevant items of information.

However, if execution proceeds to box 309, the controller client 226 can cause the hypervisor 223 to perform the requested operation. For example, the controller client 226 could invoke a function of an API to cause the hypervisor 223 to perform the requested operation. As a simple example, if the controller client 226 had received a request to reboot a virtual machine 219 at box 303, the controller client 226 could invoke a function of the API of the hypervisor 223 that causes a specified virtual machine 219 to reboot and supply the VM identifier provided in the request as an argument to the API function. Similar approaches could be utilized for causing a virtual machine 219 to terminate, migrate to another host machine 209, or cause the hypervisor 223 to perform some other operation on the virtual machine 219.

Figure 4:
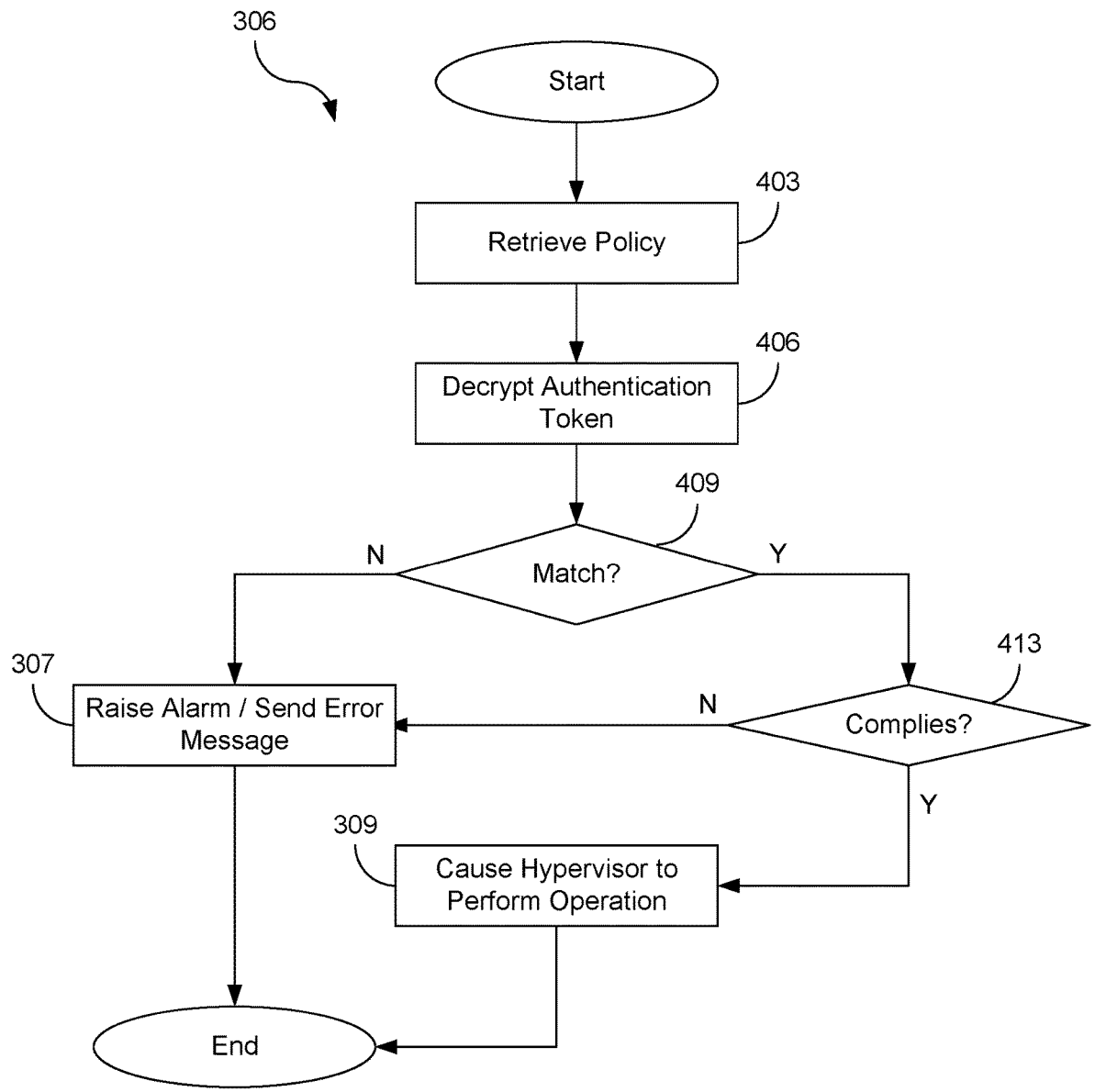
FIG. 4 is a flowchart illustrating one example of functionality implemented as portions of an application executed in a computing environment in the cloud provider network of FIG. 2 according to various embodiments of the present disclosure.

Referring next to FIG. 4, shown is a flowchart that provides one example of the operation of a portion of the controller client 226 as described at box 306 of FIG. 3 according to various embodiments. It is understood that the flowchart of FIG. 4 provides merely an example of the many different types of functional arrangements that may be employed to implement the operation of the portion of the controller client 226 as described herein. As an alternative, the flowchart of FIG. 5 may be viewed as depicting an example of elements of a method implemented in the cloud provider network 200 according to one or more embodiments.

Beginning with box 403, the controller client 226 can retrieve a policy 249 applicable to a virtual machine 219. For example, the controller client 226 can identify a respective machine record 233 for a virtual machine 219 using the machine identifier 239 of the virtual machine 219. The controller client 226 can then select a policy identifier 246 from the machine record 233. The controller client 226 can then send a request to the control data store 213 that includes the policy identifier 246 and receive a respective policy 249 in response.

Then at box 406, the controller client 226 can decrypt an authentication token included in the request received at box 303 (FIG. 3). The authentication token may, for example, be included in order to assert that the request originated from an authorized entity 256 (e.g., a user with permission to request that the operation be performed on the virtual machine). It may be provided to the controller client 226 in encrypted form in order to prevent malicious entities from intercepting the request and reusing the authentication token to perform operations that they are not authorized to perform. Accordingly, the authentication token may have been encrypted by the control server 206 using a respective public key for the private key of the host machine 209. Therefore, the controller client 226 can use the private key 236 of the host machine 209 to decrypt the encrypted authentication token in order to retrieve or generate the unencrypted authentication token.

Next at box 409, the controller client 226 can compare the decrypted authentication token with the authentication credentials 259 listed in the policy 249. If the decrypted authentication token matches an authentication token listed as an authentication credential 259 in the policy 249, then the controller client 226 can determine that the request received at box 303 was issued by or originated from an authorized entity 256. In this case, the process would proceed to box 413. However, if the decrypted authentication token fails to match an authentication token listed as an authentication credential 259 in the policy 249, then the controller client 226 can determine that the request received at box 303 did not originate from an authorized entity 256. In this case, the process would end because the request received at box 303 would fail to comply with the policy 249.

If the process proceeds to box 413, the controller client 226 can then determine whether request received at box 303 complies with the policy 249 retrieved at box 403. For example, the controller client 226 could determine whether the operation specified in the request is listed as a permitted operation 253 in the policy 249. If the requested operation is permitted, then the process would continue to box 309. However, if the requested operation is not listed as a permitted operation 253, then the controller client 226 could determine that the request fails to comply with the policy 249. In this case, the request received at box 303 would be rejected or ignored and the process would proceed to box 307.

Figure 5:
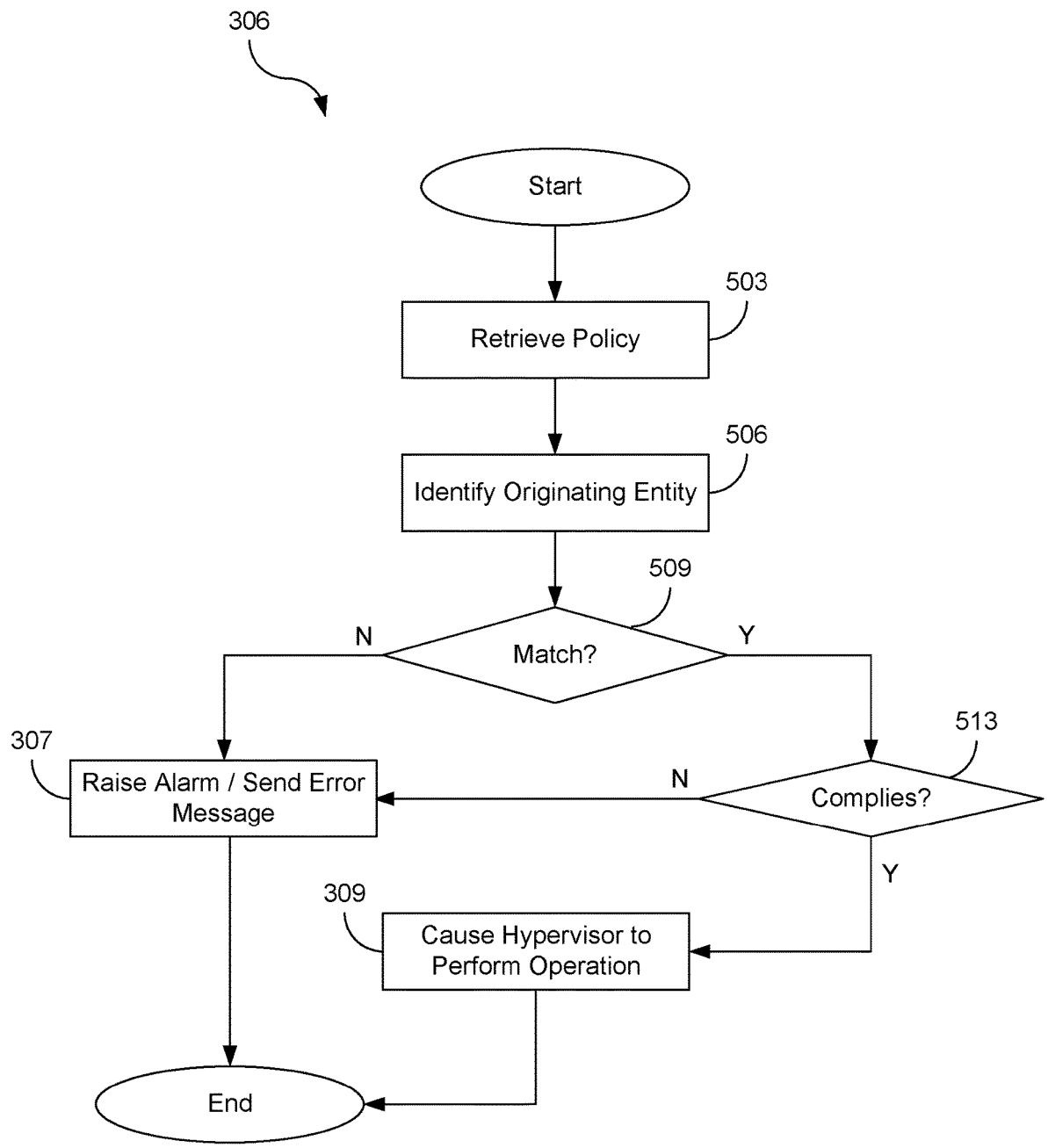
FIG. 5 is a flowchart illustrating one example of functionality implemented as portions of an application executed in a computing environment in the cloud provider network of FIG. 2 according to various embodiments of the present disclosure.

Referring next to FIG. 5, shown is a flowchart that provides one example of the operation of a portion of the controller client 226 as described at box 306 of FIG. 3 according to various embodiments. It is understood that the flowchart of FIG. 5 provides merely an example of the many different types of functional arrangements that may be employed to implement the operation of the portion of the controller client 226 as described herein. As an alternative, the flowchart of FIG. 5 may be viewed as depicting an example of elements of a method implemented in the cloud provider network 200 (FIG. 2) according to one or more embodiments.

Beginning with box 503, the controller client 226 can retrieve a policy 249 applicable to a virtual machine 219. For example, the controller client 226 can identify a respective machine record 233 for a virtual machine 219 using the machine identifier 239 of the virtual machine 219. The controller client 226 can then select a policy identifier 246 from the machine record 233. The controller client 226 can then send a request to the control data store 213 that includes the policy identifier 246 and receive a respective policy 249 in response.

Then at box 506, the controller client 226 can identify the originating entity of request (e.g., the individual, person, organization, etc. that sent the request that was received at box 303). In some instances, this information can be included within the request to perform the operation, in which case the identity of the originating entity can be extracted or read from the request. In other instances, this information may need to be inferred from the request itself. For example, the IP address that sent the request may be used as an indicator or identifier of the originating entity.

Next at box 509, the controller client 226 can compare the originating entity of the request with identifiers 263 of authorized entities 256 listed in the policy 249. If the identifier 263 of an authorized entity 256 matches the identity of the originating entity identified at box 506, then the controller client 226 can determine that the request received at box 303 was issued by or originated from an authorized entity 256. For example, if a user name included in the request to perform an operation matches a user name of an authorized entity 256, then the controller client 226 could determine that the request is from the authorized entity 256. Similar determinations could be made when a machine name or IP address is used to identity the authorized entities 256. In these cases, the process would proceed to box 513. However, if the identity of the originating entity fails to match an identifier 263 of an authorized entity 256, then the controller client 226 can determine that the request received at box 303 did not originate from an authorized entity 256. In this case, the process would end because the request received at box 303 would fail to comply with the policy 249.

Additional checks may be performed at box 509 to verify the identity of the originating entity. For example, one or more authentication credentials 259 may be verified in order to prove or confirm that the originating entity is in fact an authorized entity 256. The controller client 226 could verify a password, perform a cryptographic challenge-response protocol or operation, verify a one-time password, or a combination thereof in multi-factor authentication (MFA) schemes.

If the process proceeds to box 513, the controller client 226 can then determine whether the request received at box 303 complies with the policy 249 retrieved at box 503. For example, the controller client 226 could determine whether the operation specified in the request is listed as a permitted operation 253 in the policy 249. If the requested operation is permitted, then the process would continue to box 309. However, if the requested operation is not listed as a permitted operation 253, then the controller client 226 could determine that the request fails to comply with the policy 249. In this case, the request received at box 303 would be rejected or ignored and the process would proceed to box 307.

Figure 6:
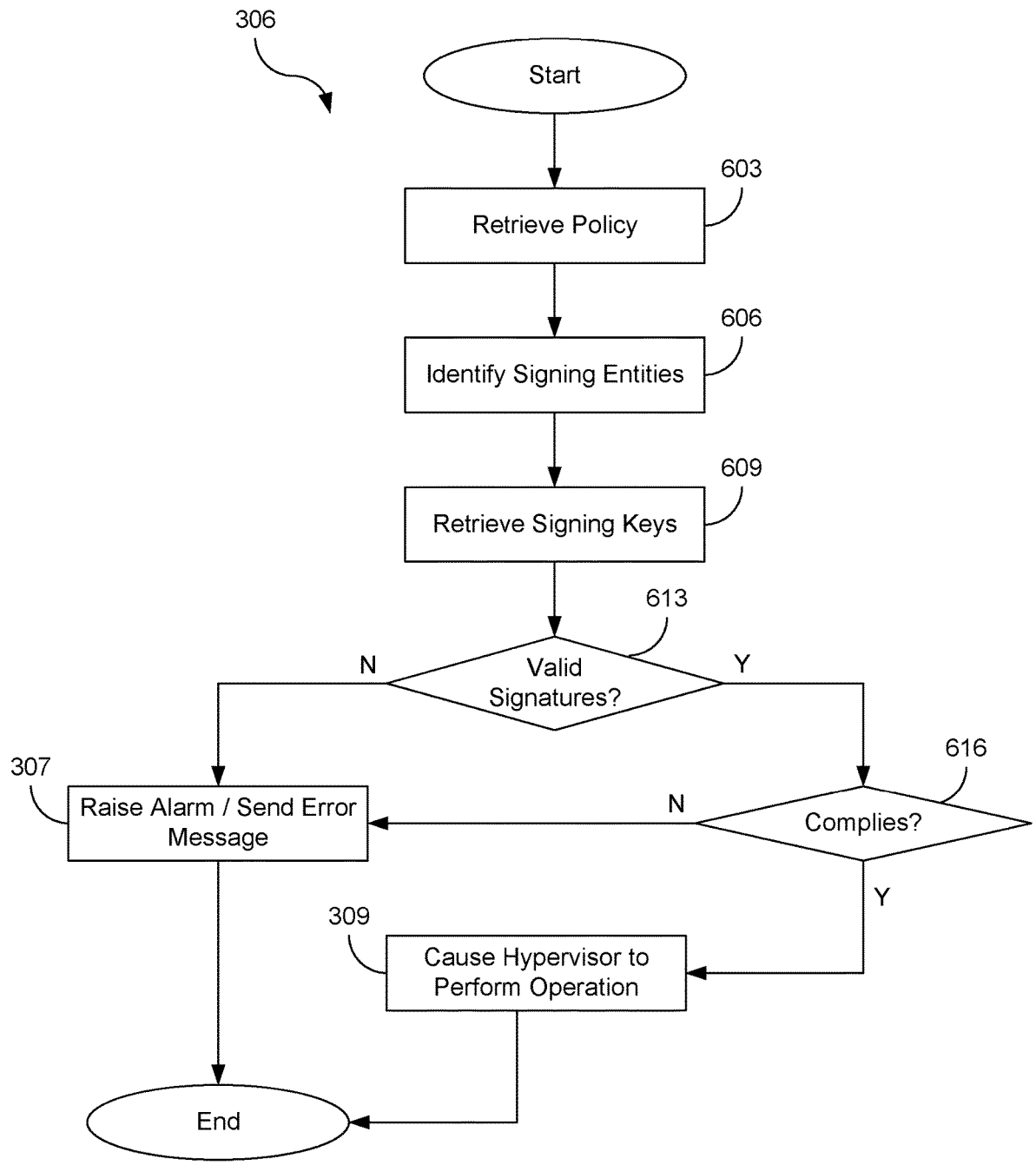
FIG. 6 is a flowchart illustrating one example of functionality implemented as portions of an application executed in a computing environment in the cloud provider network of FIG. 2 according to various embodiments of the present disclosure.

Referring next to FIG. 6, shown is a flowchart that provides one example of the operation of a portion of the controller client 226 as described at box 306 of FIG. 3 according to various embodiments. It is understood that the flowchart of FIG. 6 provides merely an example of the many different types of functional arrangements that may be employed to implement the operation of the portion of the controller client 226 as described herein. As an alternative, the flowchart of FIG. 6 may be viewed as depicting an example of elements of a method implemented in the cloud provider network 200 according to one or more embodiments.

Beginning with box 603, the controller client 226 can retrieve a policy 249 applicable to a virtual machine 219. For example, the controller client 226 can identify a respective machine record 233 for a virtual machine 219 using the machine identifier 239 of the virtual machine 219. The controller client 226 can then select a policy identifier 246 from the machine record 233. The controller client 226 can then send a request to the control data store 213 that includes the policy identifier 246 and receive a respective policy 249 in response.

Then at box 606, the controller client 226 can identify the entities that signed the request received at box 303. For example, to authenticate a request to perform an operation, the originating entity may have signed the request with a cryptographic key used for digital signatures (e.g., a signing key) or requested that certificate authority, signing authority, or other trusted intermediary sign the request on its behalf. In these instances, the identity of the signing entity is often included in the digital signature as well as a fingerprint that uniquely identifies the key used to generate the signature.

In some implementations, multiple cryptographic signatures may be required. For example, a policy 249 may specify that a command to terminate, reboot, or migrate a locked virtual machine 219 be signed by two or more unique authorized entities 256 (e.g., signed by two or more unique user accounts). In instances where such a policy is in place, the controller client 226 may perform the process described in FIG. 6 for each cryptographic signature specified as required by the policy 249.

Next at box 609, the controller client 226 can retrieve signing keys associated with the signing entities. For example, the signing entity may be identified as an authorized entity 256 in an applicable policy 249. The appropriate signing keys may be stored as authentication credentials 259 associated with the authorized entity 256.

Subsequently at box 613, the controller client 226 can determine whether the signature is valid. For example, the controller client 226 could use the signing key retrieved at box 609 to reproduce the signature. If the reproduced signature matched the signature associated with the request to perform the operation, then the signature could be presumed to be valid. This could indicate that an authorized entity 256 originated the request received at box 303. In this case, the process would proceed to box 616. However, if the signature failed to match, then the controller client 226 can determine that the request received at box 303 did not originate from an authorized entity 256. In this case, the process would end because the request received at box 303 would fail to comply with the policy 249.

If the process proceeds to box 616, the controller client 226 can then determine whether request received at box 303 complies with the policy 249 retrieved at box 603. For example, the controller client 226 could determine whether the operation specified in the request is listed as a permitted operation 253 in the policy 249. If the requested operation is permitted, then the process would continue to box 309. However, if the requested operation is not listed as a permitted operation 253, then the controller client 226 could determine that the request fails to comply with the policy 249. In this case, the request received at box 303 would be rejected or ignored and the process would end.

Figure 7:
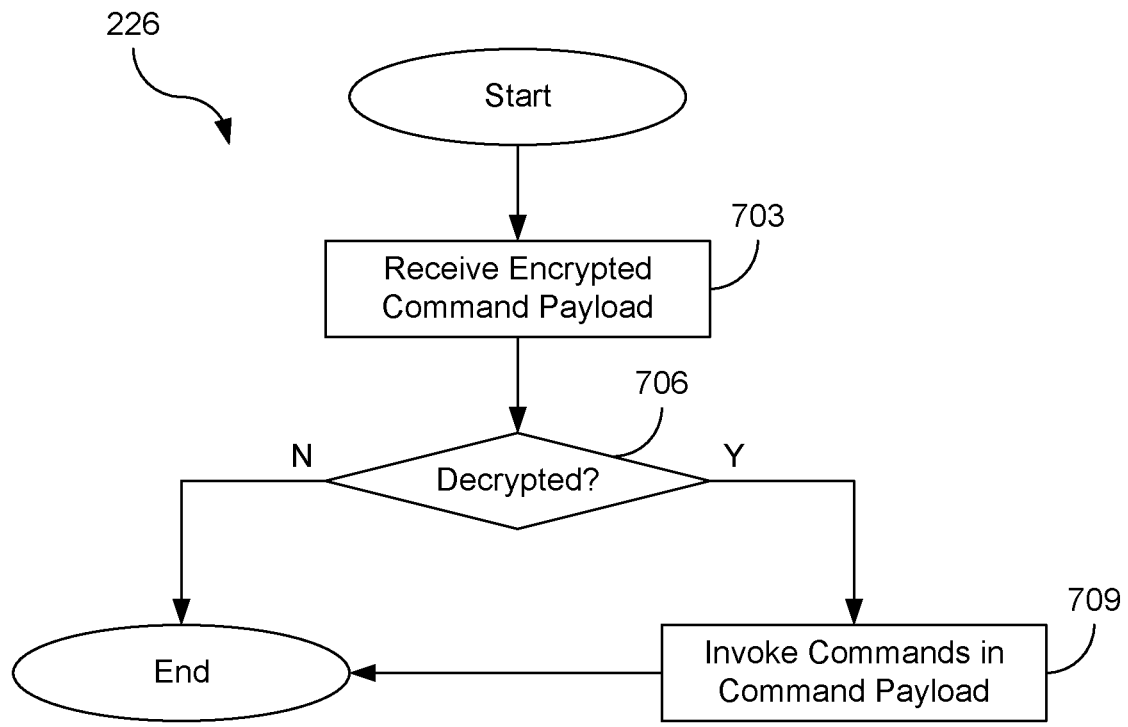
FIG. 7 is a flowchart illustrating one example of functionality implemented as portions of an application executed in a computing environment in the cloud provider network of FIG. 2 according to various embodiments of the present disclosure.

Referring next to FIG. 7, shown is a flowchart that provides one example of the operation of a portion of the controller client 226 according to various embodiments. It is understood that the flowchart of FIG. 7 provides merely an example of the many different types of functional arrangements that may be employed to implement the operation of the portion of the controller client 226 as described herein. As an alternative, the flowchart of FIG. 7 may be viewed as depicting an example of elements of a method implemented in the cloud provider network 200 according to one or more embodiments.

Beginning at box 703, the controller client 226 can receive an encrypted command payload. The encrypted command payload may be encrypted with a respective public key for the private key 236 stored in the host data store 229. Access to the public key used to create the encrypted command payload may be controlled by the control server 206 or management console 216 in order to limit those users who are able to create and send encrypted command payloads to the controller client 226 of the host machine 209. Such access may be controlled, for example, by an applicable policy 249.

As previously discussed, the command payload can take multiple forms. In some implementations, the command payload can be an executable script or sequence of commands. In these implementations, if the command payload is successfully decrypted, it may be directly executed on the host machine 209 or by the hypervisor 223. In other implementations, the command payload may instead comprise a list of commands and parameters, which can be translated or executed by the controller client 226 (e.g., by the controller client 226 invoking functions of an API provided by the hypervisor or system calls provided by the operating system of the host machine 209).

Proceeding to box 706, the controller client 226 can attempt to decrypt the encrypted command payload using the private key 236. If decryption is successful, then a valid command payload will result. If decryption is unsuccessful (e.g., because the command payload was encrypted with the wrong public key), then the result will be unintelligible to the controller client 226. Whether or not decryption was successful can be evaluated by the controller client 226 by determining whether the result of the decryption is a valid command payload. If the result is a valid command payload, then the process can proceed to box 709. If the decryption is unsuccessful, the result will be unintelligible to the controller client 226 and ignored.

At box 709, the controller client 226 can execute the commands included in the command payload. For example, if the commands specify that a virtual machine 219 is to be terminated, rebooted, migrated, etc. then the controller client 226 could invoke one or more functions provided by an API of the hypervisor 223 to cause those commands to be performed. As another example, if the commands specify that the host machine 209 itself is to perform an operation (e.g., reboot, power cycle, etc.), then the controller client 226 could cause the host machine 209 to perform the commands in the command payload. Once the commands are executed, the process can end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment or cloud provider network 200.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory;
a hypervisor stored in the memory that, when executed by the processor, causes the computing device to host one or more virtual machines; and
machine readable instructions stored in the memory that, when executed by the processor, cause the computing device to at least:
receive a request to terminate, reboot, or migrate a virtual machine hosted by the hypervisor;
determine that the virtual machine is locked to the computing device;
in response to a determination that the virtual machine is locked to the computing device, identify a user account associated with the request;
verify that the request was cryptographically signed with a cryptographic key associated with the user account to make a cryptographic signature, wherein the cryptographic signature includes a cryptographic fingerprint that uniquely identifies the cryptographic key used to generate the cryptographic signature;
receive a policy for the virtual machine over a network from a control data store;
determine that the policy specifies that the user account has permission to terminate, reboot, or migrate the virtual machine; and
in response to a determination that the request complies with the policy and that the request was cryptographically signed with the cryptographic key associated with the user account, cause the hypervisor to terminate, reboot, or migrate the virtual machine.

2. The system of claim 1, wherein the machine readable instructions stored in the memory that, when executed by the processor, further cause the computing device to at least:
identify a virtual machine identifier associated with the request; and
select the policy based at least in part on the virtual machine identifier.

3. The system of claim 1, wherein the request is received from a control server through a logical control plane in a cloud provider network.

4. The system of claim 1, wherein the cryptographic signature is a first cryptographic signature, the cryptographic key is a first cryptographic key, and the user account is a first user account, and wherein the machine readable instructions, when executed by the processor, further cause the computing device to at least:
verify the first cryptographic signature of the request and a second cryptographic signature of the request, wherein the second cryptographic signature is generated by a second cryptographic key associated with a second user account; and
determine that both the first user account and the second user account are identified by the policy as being authorized to request performance of terminating, rebooting, or migrating.

5. The system of claim 1, wherein the machine readable instructions, when executed by the processor, further cause the computing device to at least:
evaluate multiple forms of authentication provided with the request; and
determine that each of the multiple forms of authentication is associated with the user account associated with the request.

6. A system, comprising:
a computing device comprising a processor and a memory;
a hypervisor stored in the memory that, when executed by the processor, causes the computing device to host one or more virtual machines; and
machine readable instructions stored in the memory that, when executed by the processor, cause the computing device to at least:
receive a request to perform an operation on a virtual machine hosted by the hypervisor, wherein the operation is at least one of terminating the virtual machine, rebooting the virtual machine, or migrating the virtual machine to another host;
determine that the virtual machine is locked to the computer device;
receive a policy for the virtual machine over a network from a control data store;
evaluate the request to determine that the request complies with the policy for a user account;
determine that the request was cryptographically signed with a cryptographic key associated with the user account to make a cryptographic signature, wherein the cryptographic signature includes a cryptographic fingerprint that uniquely identifies the cryptographic key used to generate the cryptographic signature; and
in response to a determination that the request complies with the policy and that the request was cryptographically signed with the cryptographic key, cause the hypervisor to initiate the operation.

7. The system of claim 6, wherein:
the request comprises an encrypted authentication token that was encrypted with a public key associated with the computing device; and
the machine readable instructions that cause the computing device to evaluate the request further cause the computing device to at least:
decrypt the encrypted authentication token with a respective private key for the public key to access a first authentication token; and
determine that the first authentication token matches a second authentication token specified in the policy.

8. The system of claim 6, wherein the machine readable instructions that cause the computing device to evaluate the request further cause the computing device to at least:

identify the user account associated with the request; and
determine that the policy specifies that the user account has permission to initiate the operation.

9. The system of claim 6, wherein the machine readable instructions that cause the computing device to evaluate the request further cause the computing device to at least:
identify a machine that originated the request; and
determine that the policy specifies that the virtual machine has permission to initiate the operation.

10. The system of claim 6, wherein the machine readable instructions that cause the computing device to evaluate the request further cause the computing device to at least:
identify a network address that originated the request; and
determine that the policy specifies that requests originating from the network address have permission to initiate the operation.

11. The system of claim 6, wherein the cryptographic signature is a first cryptographic signature, the cryptographic key is a first cryptographic key, and the user account is a first user account, and wherein the machine readable instructions that cause the computing device to evaluate the request further cause the computing device to at least:
verify the first cryptographic signature of the request and a second cryptographic signature of the request, wherein the second cryptographic signature is generated by a second cryptographic key associated with a second user account; and
determine that both the first user account and the second user account are identified by the policy as being authorized to request performance of the operation.

12. The system of claim 6, wherein the machine readable instructions that cause the computing device to evaluate the request further cause the computing device to at least:
evaluate multiple forms of authentication provided with the request; and
determine that each of the multiple forms of authentication is associated with the user account associated with the request.

13. A computer-implemented method, comprising:
receiving, via a controller hosted by a computing device, a request to perform an operation on the computing device, wherein the operation is at least one of terminating a virtual machine, rebooting the virtual machine, or migrating the virtual machine to another host;
determining, via the controller hosted by the computing device, that the computing device is locked;
identifying, via the controller hosted by the computing device, a user account associated with the request;
verifying, via the controller hosted by the computing device, that the request was cryptographically signed with a cryptographic key associated with the user account to generate a cryptographic signature, wherein the cryptographic signature includes a cryptographic fingerprint that uniquely identifies the cryptographic key used to generate the cryptographic signature;
receiving, via the controller hosted by the computing device, a policy for the virtual machine over a network from a control data store;
evaluating, via the controller hosted by the computing device, the request to determine that the request complies with the policy for the user account in response to determining that the computing device is locked; and
causing, via the controller hosted by the computing device, the operation to be performed by the computing device in response to a determination that the request complies with the policy and that the request was cryptographically signed with the cryptographic key associated with the user account.

14. The computer-implemented method of claim 13, wherein evaluating the request further comprises:
determining, via the controller hosted by the computing device, that the policy specifies that the user account has permission to initiate the operation.

15. The computer-implemented method of claim 14, wherein evaluating the request further comprises:
evaluating, via the controller hosted by the computing device, multiple forms of authentication provided with the request; and
determining, via the controller hosted by the computing device, that each of the multiple forms of authentication is associated with the user account associated with the request.

16. The computer-implemented method of claim 13, wherein the cryptographic signature is a first cryptographic signature, the cryptographic key is a first cryptographic key, and the user account is a first user account, and wherein evaluating the request further comprises:
verifying, via the controller hosted by the computing device, the first cryptographic signature of the request and a second cryptographic signature of the request, wherein the second cryptographic signature is generated by a second cryptographic key associated with a second user account; and
determining, via the controller hosted by the computing device, that both the first user account and the second user account are identified by the policy as being authorized to request performance of the operation.

17. The computer-implemented method of claim 13, wherein evaluating the request further comprises:
identifying, via the controller hosted by the computing device, a network address that originated the request; and
determining, via the controller hosted by the computing device, that the policy specifies that requests originating from the network address have permission to initiate the operation.

18. The computer-implemented method of claim 13, wherein the request is received from a control server through a logical control plane in a cloud provider network.

19. The computer-implemented method of claim 13, wherein evaluating the request further comprises:
identifying a machine that originated the request; and
determining that the policy specifies that the machine has permission to initiate the operation.

20. The computer-implemented method of claim 13, wherein:
the request comprises an encrypted authentication token that was encrypted with a public key associated with the computing device; and
evaluating the request further comprises:
decrypting the encrypted authentication token with a respective private key for the public key to access a first authentication token; and
determining that the first authentication token matches a second authentication token specified in the policy.

* * * * *